Feb. 18, 1941. W. KOLLER 2,231,924
METHOD AND APPARATUS FOR PHOTOGRAPHIC COMPOSITION
Filed May 28, 1937
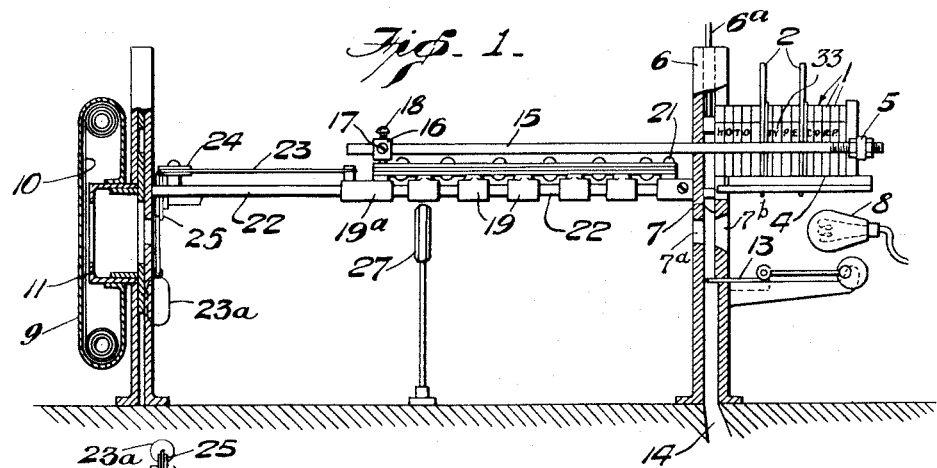
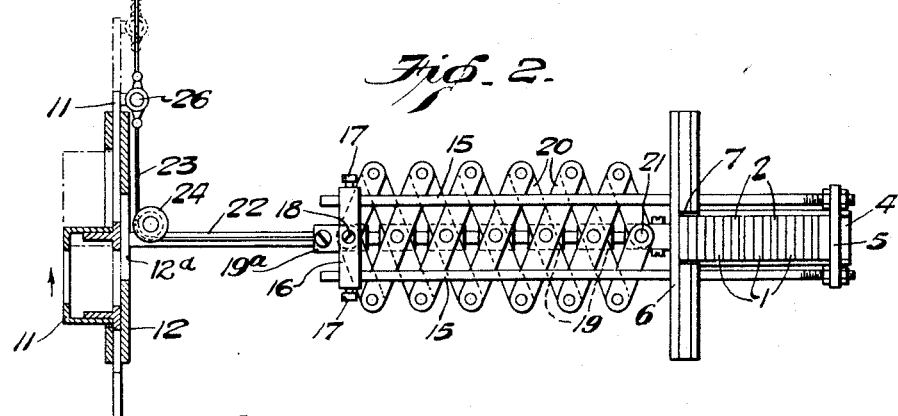
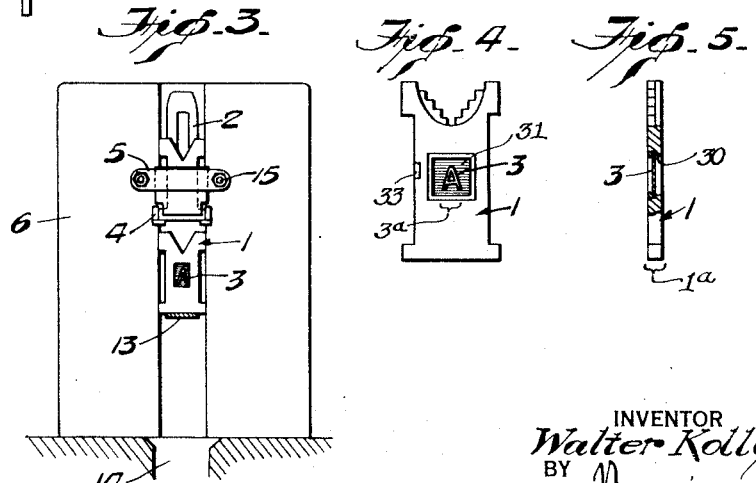
INVENTOR
Walter Koller
BY
ATTORNEYS Patented Feb. 18, 1941

2,231,924

UNITED STATES PATENT OFFICE 2,231,924

METHOD AND APPARATUS FOR PHOTOGRAPHIC COMPOSITION

Walter Koller, Kuesnacht, Switzerland, assignor to Intertype Corporation, Brooklyn, N. Y., a corporation of New York Application May 28, 1937, Serial No. 145,374
In Switzerland June 11, 1936

32 Claims. (Cl. 95—4.5)

The present invention relates to a method of and apparatus for photographically producing type matter for printing processes, and more particularly for offset and intaglio printing, preferably by employing the well known matrix line composing machine in which character bearing elements or matrices and space elements are composed into lines which may be justified to a definite line-length. In the present invention the individual matrices and space elements in such a line are displaced in sequence from the composed line and presented in said sequence in front of a photographic camera for exposure to a sensitized film whereby the sum of the separate photographs, with proper word spaces, results in a photographically reproduced line on a light-sensitive surface or film. The sensitized film will of course be moved for each exposure to advance it to an extent proportioned to dimensions of the displaced matrices and spaces, it being understood that the matrices may have dimensions, such as thickness, proportioned to the setwise width of their particular characters just as is usual with the matrices employed in the line composing machines above referred to.

The present application is a continuation-in-part of my prior application, Serial No. 114,039, filed December 3, 1936.

According to the present embodiment of the invention, as each type element or spacer element, as the case may be, is removed from the composed line, the space occupied by such removed element is filled by advancing the elements remaining in said line to bring the next element into position for displacement, and this line advancing movement is transmitted, through suitable connecting members, to the sensitized film or other surface to advance it the proper amount to receive the next succeeding photographic impression.

Referring to the accompanying drawing,

Figure 1 is a vertical longitudinal section showing a justified matrix line and the members for transmitting the line-advancing movement to the light-sensitive surface, Figure 2 is a top plan view of the apparatus shown in Fig. 1, the left hand portion of this figure being shown in horizontal section, Figure 3 is an elevation of the apparatus shown in Figs. 1 and 2 as viewed from the right hand end thereof, Figure 4 is an elevation of one of the type elements or matrices, and Figure 5 is an edge view, partly in section, of the element shown in Fig. 4.

Similar parts are designated by the same reference characters in the different figures.

With continued reference to the drawing, I designates type or line elements or matrices, the configuration or outline of which preferably conforms with that of the matrices commonly used in line composing machines of the usual and well known kinds and the thickness of which varies as usual according to the setwise width of the particular character thereon.

In such line-composing machines as referred to the matrices used in the machines bear indented characters punched on their edge surfaces. These matrices are stored in a magazine and are selectively released therefrom and assembled into composed lines by an operator pressing keys on a keyboard. After the matrices, together with spacer elements between words, are thus assembled the spacer elements are expanded to expand the line to a definite predetermined length. Molten type metal is then cast against the character-bearing edges of the matrices making up the expanded or justified line, to form a line or slug of type. Each matrix has a body thickness proportioned to the setwise width of the character that it bears so that the letters in the slug cast from the composed line are uniformly spaced from each other, in contradistinction to the unequal spacing between the characters in a typewritten line.

The type elements or matrices, as shown in Figures 4 and 5, comprise a matrix body I having an opening or window 30 extending between the sides or faces of the matrix body I, and in which is mounted a plaque 31 bearing the character 3. The body thickness I—a of the matrix body I, as shown in Figures 4 and 5, may be made equal to or in some proportion to the setwise width of the character 3 on the plaque 31. In the element shown in the drawing the actual body width I—a is less than but is in proportion to the setwise width of the character 3.

The plaque may comprise an opaque film on which is outlined transparent portions for the projection or transmission of light therethrough and which transparent portions form the character 3. The matrix may also be made up for photographing by reflected light in which case the plaque would be opaque and would carry the character thereon on a contrasting or distinguishing background from which the character would stand out for photographing purposes. The type elements or matrices thus formed, as shown in Figures 4 and 5, each have a character 3 disposed in a plane parallel to but preferably located between the flat sides or faces of the matrix. In addition, each matrix may be provided with a reference character, as shown at 33, punched or otherwise formed on the edge of the matrix body. These characters 33 serve to enable the operator to read and check the words as he composes the matrices into lines as above described.

Referring again to Figure 1, 2 designates the spaces or spacer elements used between words. The spacers may be of the usual wedge or expansive type as used in line-composing machines for justifying the composed lines of matrices. After the spacer elements have been expanded to justify the composed line of matrices, it is desirable that the spacer elements remain in their expanded justifying condition until removed from the composed line. This may be accomplished by using spacers of a friction-held type, such as are in common use, which spacers maintain their expanded condition independently of external forces or holding means. The spacers are blank or opaque elements and when presented before the photographing apparatus, as will be described, intercept the light from the light source so that no light reaches the photographing surface. After the type elements or matrices and the spacers are composed, the resulting line thereof is justified by expanding the spacers to obtain a definite line length in the usual way or manner similar or equivalent to that employed in a line-composing machine of known construction.

The photographing apparatus, as shown, comprises a channel 4 in which the completely composed and justified line of matrices is contained. The matrices in the line are pressed by a movably arranged cross-bar or follower 5 toward a wall 6 at one end of the channel. The line elements 1 and 2 are successively pushed down edgewise or laterally out of the line and thus removed or displaced individually therefrom, by any suitable means, such as a vertically reciprocable blade 6ª which pushes the elements downward through a channel 7 into position in front of the lens of a photographic camera for photographic exposure. The blade 6ª, which removes the line elements 1 from the composed line one at a time, is preferably thinner than the line element of the font having the smallest edgewise or body thickness so that as the blade moves down it will displace but one element from the composed line per stroke. This construction is diagrammatically shown in the drawing.

The line element is pushed by the blade to a point where it is brought into photographic alignment, as by resting on an oscillatory escapement 13, between a lamp or other suitable light-source 8 and a camera or photographic apparatus. The camera comprises a casing 9 containing a photographic film or other suitable light sensitive surface 10, said casing being supported by a slide 11 guided to move horizontally in a suitable upright stationary support 12. The film 10 is of course protected from receiving light except through the character-bearing plaque 31 of the line element in photographing position in the channel 7. This operation may be carried out by any of the well known shutter arrangements. After the photographic exposure has been made of each line element, such element is released by any suitable means, such as by the reciprocation of the escapement 13 on which the line elements rest during exposure, and the released element passes down through the channel 14 and is eventually returned to the magazine or place of storage in the line composing machine from which it was drawn.

For the successive photographic exposures of the line elements, as above described, the slide 11 is moved step by step in the direction of the arrow shown on Figure 2. This step by step movement of the slide also moves the film 10 carried by the slide. The step by step movement of the film causes the successively presented characters from the composed line to be photographed in line across the width of the film 10 to form a line of type matter. To this end the film is preferably sufficiently wide to photograph the line elements of a complete composed line This stepwise movement of the film 10 is coordinated with the successive displacements of the matrices from the composed line by a connection which transmits the movement of the follower or cross-bar 5, after each line-element 1 or 2 has been removed from the line, to the light-sensitive surface to advance it, as above described. Preferably and as shown in the present instance, such transmission may be effected in different ratios.

For this purpose, the follower or cross-bar 5 is connected by a pair of reciprocatory rods 15 to a second cross-bar 16 which is adjustable longitudinally along said rods and may be fastened by screws 17 at different points along the length of said rods, and when brought into one or another position, may be connected by a screw 18 with the respective middle pivot joint 19 of a lazy-tongs 20, one end of which is pivotally connected at 21 to the relatively fixed wall 6, and the middle joints of which are slidable on a guide rail 22. In Figs. 1 and 2 the cross-bar 16 is shown connected with the terminal joint at the left hand end of the lazy-tongs, and a cord 23 is connected with this terminal joint of the lazy-tongs by the slide 19ª, then passes over pulleys 24 and 25 and carries a weight 23ª at its end, and this cord is connected at 26 to the slide 11 carrying the light-sensitive surface 10 so that when said cord is moved by the weight as the line is pushed together (after the removal of a matrix), the light-sensitive surface will be advanced through a distance which is in the proportion of 1:1 to the movement of the follower or cross-bar 5. Consequently, the slide 11 connected to said cord and carrying the light-sensitive surface 10 will advance laterally in the direction of the arrow as shown in Figure 2 through a distance equal to the thickness of the line-element such as a matrix 1 or to the expanded thickness of the spacer 2 which is displaced or removed from the channel 5. It will be understood that since the thickness 1—a of the matrices varies in accordance with the setwise width 3—a of the particular characters on the flat sides thereof and may be equal to or in some proportion to the actual width of such characters, the lateral step by step advance of the sensitized surface through the proper distance for receiving successive photographic impressions of the characters will be determined by and be dependent upon the thickness of the respective matrices. Such thickness of each displaced element will be measured, of course, by the amount of movement necessary to close together facewise the matrices and expanded spacers remaining in the line, to fill the space occupied by the last displaced line element.

If the cross-bar 16 is connected by the screw 18

18 to any intermediate joint 19 of the lazy-tongs and, in such position is fastened by the screws 17 to the rods 15, each advancing movement of the follower or cross-bar 5 will then produce a proportionately greater movement of the terminal tongs-joint to which the cord 23 is connected. Consequently, the light-sensitive surface 10 connected to said cord will also be moved through a greater distance. If therefore the type-characters are enlarged in being photographed as by adjustment of the lens 27, it is possible, by adjusting the cross-bar 16 in relation to the lazy-tongs, to move the light-sensitive surface 10 to a greater extent to accord with the greater width of the enlarged type-characters and spaces.

It will be understood that instead of using lazy-tongs, any other suitable device for altering the ratio of transmission of movement from the line-advancing element 5 to the light-sensitive surface may be used.

I claim as my invention:

1. The method of photographically producing lines of type matter for printing processes from composed lines of character bearing elements varying in thickness according to the setwise width of the characters they bear on a face normal to the element thickness and to the longitudinal axis of the composed lines, said method comprising laterally displacing said elements singly and successively from their composed position at one end of the line and moving them each into a common position for photographic exposure to a sensitized surface, moving the elements remaining in the composed line in a direction parallel to the axis of the line after each displacement of an element to fill the space occupied by the displaced element and advancing said sensitized surface for each exposure a distance proportional to and governed by the above movement of the elements.

2. The method of photographically producing justified lines of type matter for printing processes from elements bearing type characters disposed between flat side faces wider than the edges of the elements and normal thereto and composed into lines with the side faces in intimate contact, said lines being justified to a desired length by spacer elements, comprising displacing the elements singly in an edgewise direction from one end of the line to bring them successively to a common photographing position, advancing the line endwise after each displacement of an element to bring the next element into position for displacement, photographically exposing the characters on each displaced character bearing element to a sensitized surface disposed normal to the longitudinal axis of the line, and moving the sensitized surface for each exposure a distance proportional to the amount of movement which takes place in advancing the line after displacement of each character and spacer element, thereby producing successive photographic impressions so spaced relatively as to form a justified line.

3. Apparatus for producing type matter from composed lines of character bearing matrices comprising a channel having a fixed wall adapted to engage and support one end of the matrix line in said channel, a movable follower constituting a wall to engage the opposite end of the line, means operative to laterally displace out of the line the matrix engaged by the fixed wall, means operative to move the follower to advance the line along the channel after such displacement, photographic means including a movable sensitized surface for photographically reproducing the character on the displaced matrix, and means for moving said sensitized surface in response to the movement of the follower to control the location of the photographically reproduced character on said sensitized surface.

4. Apparatus for photographically producing type matter from a composed line of character bearing matrices, comprising a channel having fixed and movable walls adapted to engage with and support the opposite ends respectively of the line, means for laterally displacing out of the line the matrix adjacent to the fixed wall and means operative to move the movable wall after such displacement to advance the line and bring the next matrix into engagement with said wall, photographic means including a movable sensitized surface to receive photographic impressions, means for receiving and retaining the displaced matrix in proper objective relation to said photographic means for photographic exposure of its character thereto and means responsive to the movement of said movable wall for advancing said movable sensitized surface to control the location of the reproduced character thereon.

5. Apparatus for photographically producing type matter from a composed line of character bearing matrices, comprising a channel having fixed and movable walls adapted to engage with and support the opposite ends respectively of the line, means for laterally displacing out of the line the matrix adjacent to the fixed wall and means operative to move the movable wall after such displacement to advance the line and bring the next matrix into engagement with said wall, movable photographic devices including a sensitized surface to receive photographic impressions, means for receiving and retaining the displaced matrix in proper objective relation to said devices for photographic exposure of its character thereto and connecting means between the photographic devices and the movable wall of the channel for effecting relative movement between said devices and the matrix retaining means.

6. Apparatus for photographically producing a line of type matter for printing processes from a composed line of character bearing matrices varying in thickness in proportion to the setwise width of their characters, comprising a channel adapted to support the matrices with the characters thereon disposed in planes normal to the longitudinal axis of said channel and having fixed and movable walls adapted to engage the opposite ends respectively of the line and retain the matrices thereof in compact relation, means for laterally displacing out of the line the matrix adjacent the fixed wall to bring said matrix into a position for photographic exposure of the character thereon, means operative to move the movable wall after such displacement to bring another matrix into operative relation to said displacing means, movable devices including a sensitized surface disposed parallel to the character planes of the matrices for photographically reproducing the character on the displaced matrix, and means operative to move said devices under control of the movement of the movable wall to an extent proportional to the thickness of the displaced matrix.

7. Apparatus for photographically producing a line of type matter for printing processes from a line of matrices of varying thicknesses, each of which matrices is provided with a type character disposed in a plane parallel to but between flat side faces defining such thickness, comprising a channel having fixed and movable walls adapted to engage the end matrices of the line and support the latter in said channel with the flat side faces of the matrices in planes normal to the longitudinal axis of the line, means for laterally displacing out of the line the matrix adjacent the fixed wall to position said matrix for photographic exposure of the character thereon, means operative to move the movable wall after such displacement to bring another matrix into position for displacement, movable devices including a sensitized surface disposed normal to the longitudinal axis of the line and opposite the matrix displaced from the end thereof for photographically producing the character on said displaced matrix, and means operative to move said devices in response to movement of the movable wall to an extent determined by the thickness of the displaced matrix.

8. Apparatus for photographically producing type matter from a composed line of character bearing matrices, comprising a line supporting channel having fixed and movable walls adapted to engage the opposite ends respectively of the line, means for laterally displacing out of the line the matrix adjacent the fixed wall and moving it into a position for photographic exposure of the character thereon, means operative to move the movable wall after such displacement to bring another matrix into operative relation to said displacing means, movable devices including a sensitized surface for photographically reproducing the character on the displaced matrix, and adjustable connecting means between said devices and the movable wall of the channel to effect proportionate movement of said devices in different ratios to the amount of movement of said wall according to the adjustment of the connecting means.

9. Apparatus for producing type matter from composed lines of character-bearing elements varying in thickness according to the width of the characters thereon and also spacer elements, comprising a channel to contain such composed lines, means for displacing the elements singly from the line, means for moving the elements remaining in the line to fill the space left by the removed element, means for photographing each displaced element individually on a sensitized surface, and means controlled by said moving means for relatively advancing the sensitized surface for each photographic exposure a distance determined by the thickness of the respective displaced elements.

10. Apparatus for producing type matter from composed lines of character-bearing elements varying in thickness according to the setwise width of their respective characters and also spacer elements, comprising a channel to contain such composed lines, means for displacing the elements singly from the line, means for photographing singly on a sensitized surface each displaced element, a follower operative to move the remaining elements in the line to fill the space occupied by the removed element, and means controlled by the movement of said follower for relatively advancing the sensitized surface occording to the varying thicknesses of the respective elements displaced from the line.

11. Apparatus for producing type matter from composed lines of character-bearing elements differing in thickness according to their respective character and justified to a desired length by expansible spacer elements, comprising a channel to contain such composed lines, means for photographing singly the elements in the line in sequence on a sensitized surface, means for displacing the elements singly from one end of the line, a follower operative to advance the remaining elements in the line after each element is removed therefrom, and means controlled by the movement of said follower for relatively advancing the sensitized surface a distance proportionate to the extent of movement of said follower and determined by the thickness of the respective elements removed from the line.

12. Apparatus for producing type matter from composed lines of character-bearing elements varying in thickness in proportion to the width of the respective characters and also expansible spacer elements for justifying the lines and varying in thickness according to the amount of expansion required to effect justification, comprising a channel to contain such composed lines, means for displacing the elements singly and successively from one end of the line, means for advancing the remaining elements along the channel after each element is removed from the line, means for photographing each displaced element individually on a sensitized surface, and means controlled by said advancing means for relatively moving the sensitized surface for each photographic exposure different extents proportionate to the extent of the movements of the advancing means, and determined by the thickness of the respective elements displaced from the line.

13. Apparatus for producing type matter from composed lines of character-bearing elements varying in thickness between parallel opposed side faces according to the width of the respective characters disposed thereon in a plane parallel to said side faces and said lines being justified to a desired length by expansible spacer elements, comprising a channel to contain such composed lines, means for displacing the elements singly and successively from one end of the line, means for advancing the line endwise along the channel after each displacement of an element, means for photographing each displaced element individually on a sensitized surface disposed endwise of the line, and adjustable means controlled by the line advancing means for relatively advancing the sensitized surface for each photographic exposure different extents proportionate to the amount of movement of said line advancing means and varying according to the thickness of the respective elements displaced from the line.

14. Apparatus for producing type matter from composed lines of character-bearing elements varying in thickness between parallel opposed side faces in proportion to the width of the respective characters disposed thereon in a plane parallel to said side faces and justified to a desired length by expansible spacer elements, comprising a channel to contain such composed lines, means for displacing the elements singly from one end of the line, means for advancing the elements remaining in the line after each displacement of an element to position the next element for displacement, means for retaining each displaced element in position for photographic exposure individually on a sensitized surface normal to the longitudinal axis of the line, and means including a lazy-tongs controlled by said advancing means and adjustable to relatively move the sensitized surface for each exposure different extents proportionate to the extents of the movements of the advancing means and determined by the thickness of the respective elements displaced from the line.

15. The method of photographically producing on a sensitized surface a justified line of type matter to be used in printing processes which comprises, composing a line from a font of elements bearing photographable characters between their faces but not extending to the edges thereof, said elements having thickness values proportioned to the width values of the characters borne thereby and expansible spacer elements, justifying the composed line by expanding said spacer elements, progressively removing said elements from the justified line while maintaining the expanded spacer elements left in the composed line in their expanded justifying position, reproducing photographically in line on said sensitized surface the character of each progressively removed element in the order of its removal, and simultaneously locating each succeeding photographically reproduced character or blank in its relation to the next preceding character or blank from the thickness value of the element from which the succeeding character or blank is reproduced.

16. The method of photographically producing a justified line of type matter upon a sensitized surface from opaque spacer elements and elements bearing between their setwise faces but not extending to the edges thereof patterns having opaque and light-transmitting portions, the thickness values of said elements being proportioned to the width values of characters of the patterns carried by the elements comprising, composing a line of said elements, justifying the composed line with spacer elements, successively removing the elements from the composed line in the order of their sequence to photographing position between a light source and the sensitized surface to reproduce in line the characters of the composed line, and successively relatively moving in a line said sensitized surface and the photographing position amounts proportioned to the thickness values of the elements photographed.

17. The method of photographically reproducing a line of type matter upon a sensitized surface from spacer elements and elements bearing photographable characters between the setwise faces of the elements but not extending to the edges thereof, the thickness values of said last elements being proportioned to the width values of the characters carried thereby, comprising, composing a line of said elements, justifying the composed line with the spacer elements, successively displacing the elements from one end of the composed line to photographing position with respect to the sensitized surface, and moving the remaining elements of the composed line to fill the space occupied by the displaced element, photographing the displaced element and relatively moving in a line the sensitive film and the photographing position an amount proportioned to the said movement of the elements remaining in the composed line.

18. In apparatus for photographically producing type matter from composed lines of character-bearing elements having dimensions corresponding to the width values of the characters thereon, in combination, means for holding a composed line of said elements, means for separately and progressively removing said elements from the line, means for separately photographing in line the characters of the elements removed in the order of their removal, and means for controlling the setwise spacing of the photographically reproduced characters from the said dimensions of the progressively removed elements.

19. In apparatus for photographically producing type matter from composed lines of character-bearing elements having dimensions corresponding to the width values of the characters thereon, comprising, in combination, means for holding a composed line of said elements, photographing means including a sensitized surface located endwise of said line for progressively photographing the characters of the elements of said line, and means for progressively removing said elements from one end of said line for progressively exposing said elements to said photographing means, and means for controlling the location of the photographically reproduced characters on said sensitized surface from the said dimensions of the elements removed.

20. In apparatus for photographically producing type matter from composed lines of character-bearing elements having thickness values proportioned to the width values of the characters thereon, in combination, means for holding a composed line of said elements including relatively movable end walls, means for causing said end walls to press on the ends of the composed line, means for progressively removing the elements from the line, means for photographing the removed elements including a photographic surface, means for conducting said progressively removed elements to said photographic means and for aligning them therewith for photographing, and means responsive to the closing of said end walls due to the shortening of said line as said elements are removed for relatively moving the surface and aligning means to locate the photographically reproduced characters on said photographic surface.

21. In apparatus for photographically producing type matter from composed lines of character-bearing elements having thickness values proportioned to the width values of the characters thereon, in combination, means for holding a composed line of said elements, means for progressively removing said elements from the composed line, holding means for progressively receiving said removed elements for photographing, means for photographically reproducing in line the characters of the elements progressively received by said holding means, and means responsive to the shortening of the composed line as its elements are progressively removed for relatively moving the photographing means and the holding means to control the location in line of the photographically reproduced characters.

22. In apparatus for photographically producing type matter from composed lines of character-bearing elements having thickness values proportioned to the width values of the characters thereon, in combination, means for holding a composed line of said elements, means for progressively removing said elements from the composed line, holding means for receiving said removed elements for photographing and for discharging the elements after photographing, means for photographically reproducing in line the characters of the elements received by said holding means, and means responsive to the shortening of the composed line as its elements are progressively removed for relatively moving the photographing means and the holding means to control the location in line of the photographically reproduced characters.

23. In apparatus for producing type matter from a composed line of character-bearing elements having body thicknesses proportioned to the width values of the characters borne thereby, in combination, means for holding a composed line of said elements arranged with the broad faces thereof perpendicular to the axis of the composed line, means for holding said elements together, means for progressively removing the elements from one end of the line, means for photographically reproducing on a sensitized surface the characters of the elements as they are progressively removed, means responsive to the shortening of said composed line of elements as the elements are progressively removed therefrom for moving said sensitized surface to present fresh sensitized areas for each photographing operation, and means for adjusting the proportional movement of said surface caused by said responsive means.

24. In apparatus for producing type matter from a composed line of character-bearing elements having body thicknesses proportioned to the width values of the characters borne thereby, in combination, means for holding a composed line of said elements arranged with the broad faces thereof perpendicular to the axis of the composed line, means for holding said elements together, means for progressively removing the elements from one end of the line, means for photographically reproducing on a sensitized surface the characters of the elements as they are progressively removed, means responsive to the shortening of said composed line of elements as the elements are progressively removed therefrom for moving said sensitized surface to present fresh sensitized areas for each photographing operation, means for adjusting the proportional movement of said surface caused by said responsive means, and means for adjusting the magnification of the characters reproduced on said sensitized surface.

25. The photographic method of reproducing a line of type matter on a sensitized surface from a font of photographable character-bearing elements having pre-determined dimensions proportioned to the width values of the characters thereon comprising, composing a line of said elements, relatively moving one character-bearing element and a camera carrying said sensitized surface to bring the element into photographic position in the front focal plane of said camera, photographing the character of said element on said sensitized surface, relatively feeding in line the sensitized surface and said photographic position a distance proportional to the dimensions of said element to bring the sensitized surface and the focal plane into photographing relationship for the next photographing step of the next succeeding element, and repeating the moving, photographing and feeding steps for each element in the order of their composition to reproduce in line on said sensitized surface the characters of each of said composed line of elements.

26. The photographic method of producing a line of type matter on a sensitized surface from photographable character-bearing elements the thickness values of which are proportioned to the width values of the characters thereon, comprising, composing a line of said elements, positioning one element with its character in photographic position in the front focal plane of a camera carrying said sensitized surface, photographing the character of said element on said sensitized surface, feeding the sensitized surface along a line a distance proportional to the thickness of said element, and repeating said positioning, photographing, and feeding steps for each character in order of their composition to reproduce in line on said sensitized surface the characters of each of said composed line of elements.

27. The photographic method of reproducing a line of type matter on a sensitized surface from a font of photographable character-bearing elements having predetermined dimensions proportioned to the width values of the characters thereon, comprising, composing a line of said elements, removing one character-bearing element from said composed line and moving it into photographic position in the front focal plane of said camera, photographing the character of said element on said sensitized surface, feeding the sensitized surface along a line a distance proportional to the dimensions of said element, and repeating the removing and moving, photographing and feeding steps for each character in the order of their composition.

28. The photographic method of producing a line of type matter on a sensitized surface from photographable character-bearing elements the thickness values of which are proportioned to the width values of the characters thereon, comprising, composing a line of said elements, removing the first element from the composed line and positioning it with its character in photographic position in the front focal plane of a camera carrying said sensitized surface, photographing the character of said element on said sensitized surface, feeding the sensitized surface along a line a distance proportional to the thickness of said element, and repeating said removing, positioning, photographing, and feeding steps for each character in order of their composition.

29. The photographic method of reproducing a line of type matter on a sensitized surface from a font of photographable character-bearing elements having predetermined dimensions proportioned to the width values of the characters thereon, comprising, composing a line of said elements, relatively moving one character-bearing element and a camera carrying said sensitized surface to bring the element into photographic position in the front focal plane of said camera, photographing the character of said element on said sensitized surface, feeding the sensitized surface along a line a distance proportional to the dimensions of said element, and repeating the moving, photographing and feeding steps for each character in the order of their composition.

30. The photographic method of reproducing a line of type matter on a sensitized surface from a font of photographable character-bearing elements having predetermined dimensions proportioned to the width values of the characters thereon, comprising, composing a line of said elements, removing the first character-bearing element from said composed line to a light source and into photographic position into the front focal plane of a camera carrying said sensitized surface, photographing the character of said element on said sensitized surface, feeding the sensitized surface along a line a distance proportional to the dimensions of said element and repeating the removing and positioning, the photographing and the feeding steps for each element in the order of their composition to reproduce in line on said sensitized surface characters of each of said composed line of elements.

31. The photographic method of producing a justified line of type matter on a sensitized surface from photographable character-bearing elements, the thickness values of which are proportioned to the width values of the characters thereon, comprising, composing a line of said elements, justifying the composed line with spacer elements, positioning one element with its character in photographic position in the front focal plane of a camera carrying said sensitized surface, photographing the character of said element, relatively feeding the sensitized surface along a line a distance proportional to the thickness of said element, and repeating said positioning, photographing and feeding steps for each element and spacer element in the order of their composition.

32. The photographic method of producing a justified line of type matter on a sensitized surface from photographable character-bearing elements the thickness values of which are proportioned to the width values of the characters thereon and from expansible spacer elements, comprising, composing a line of said elements, justifying said line by expanding said spacer elements, removing the first element from said line with its character to photographic position in the front focal plane of a camera carrying said sensitized surface, photographing said element, relatively feeding the sensitized surface along a line a distance proportional to the effective thickness of said element, and repeating said removing, photographing and feeding steps for each element in the order of their composition to reproduce in line on said sensitized surface the characters and blanks of each of said composed line of elements.

WALTER KOLLER.